United States Patent
Peri

(10) Patent No.: US 8,453,439 B2
(45) Date of Patent: Jun. 4, 2013

(54) TORQUE CONVERTER TURBINE SIDE BEARING CENTERING AND RETENTION ON THE STATOR

(75) Inventor: Patanjali Peri, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1143 days.

(21) Appl. No.: 12/378,692

(22) Filed: Feb. 18, 2009

(65) Prior Publication Data

US 2009/0205916 A1 Aug. 20, 2009

Related U.S. Application Data

(60) Provisional application No. 61/066,301, filed on Feb. 19, 2008.

(51) Int. Cl.
F16D 33/00 (2006.01)
(52) U.S. Cl.
USPC .............................................. 60/331
(58) Field of Classification Search
USPC .................... 60/330, 345, 361, 362; 384/618, 384/620–623
See application file for complete search history.

(56) References Cited

U.S. PATENT DOCUMENTS

| | | | | |
|---|---|---|---|---|
| 3,518,026 A | * | 6/1970 | Iijima | 416/197 R |
| 4,733,979 A | * | 3/1988 | Tsuruki | 384/620 |
| 5,489,255 A | | 2/1996 | Hinckley et al. | |
| 5,918,987 A | | 7/1999 | Sundquist et al. | |
| 6,036,373 A | | 3/2000 | Faass et al. | |
| 6,044,946 A | | 4/2000 | Makino et al. | |
| 6,205,779 B1 | * | 3/2001 | Botosan et al. | 60/330 |
| 2002/0153217 A1 | * | 10/2002 | Sato | 192/45.1 |
| 2004/0211173 A1 | * | 10/2004 | Ono et al. | 60/330 |
| 2007/0137977 A1 | | 6/2007 | Peri et al. | |

* cited by examiner

*Primary Examiner* — Edward Look
*Assistant Examiner* — Logan Kraft
(74) *Attorney, Agent, or Firm* — Simpson & Simpson, PLLC

(57) ABSTRACT

A torque converter, including: a washer for a thrust bearing, the washer including a first circumferential surface facing radially outward; a stator hub with a second circumferential surface facing radially inward and free of an interlocking engagement with the first circumferential surface; and a shell for a turbine, the shell including a third circumferential surface facing radially inward. The washer is radially inwardly retained by contact between the first circumferential surface and the second or third circumferential surface. In a preferred embodiment, the washer is radially centered by contact between the first circumferential surface and the second or third circumferential surface. In another preferred embodiment, the hub includes at least one radially inwardly extending protrusion and the washer is retainable in an axial direction by the at least one protrusion.

2 Claims, 3 Drawing Sheets

TORQUE CONVERTER TURBINE SIDE BEARING CENTERING AND RETENTION ON THE STATOR

CROSS-REFERENCE TO RELATED APPLICATIONS

This application claims the benefit under 35 U.S.C. §119(e) of U.S. Provisional Application No. 61/066,301, filed on Feb. 19, 2008, which application is incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a thrust bearing centered by contact with a stator hub or a turbine shell.

BACKGROUND OF THE INVENTION

Commonly owned U.S. patent application Ser. No. 11/641,495, filed Dec. 19, 2006 discloses centering a thrust bearing for a torque converter by providing centering features on a side plate for a stator in the torque converter. However, the cost and complexity of the torque converter could be reduced if a means for centering the thrust washer, using already existing and configured components in the torque converter, could be found.

U.S. Pat. No. 6,044,946 discloses the use of a recess in a stator hub to hold a washer for a thrust bearing in a torque converter. Unfortunately, the hub and the washer include respective pluralities of interlocking protrusions, greatly complicating the fabrication of the hub and the washer.

Thus, there is a long-felt need for a means of centering a thrust bearing in a torque converter by use of simple, existing component configurations in the torque converter.

BRIEF SUMMARY OF THE INVENTION

The present invention broadly comprises a torque converter, including: a washer for a thrust bearing, the washer including a first circumferential surface facing radially outward; a stator hub with a second circumferential surface facing radially inward and free of an interlocking engagement with the first circumferential surface; and a shell for a turbine, the shell including a third circumferential surface facing radially inward. The washer is radially inwardly retained by contact between the first circumferential surface and the second or third circumferential surface. In a preferred embodiment, the washer is radially centered by contact between the first circumferential surface and the second or third circumferential surface.

In a first embodiment, the washer is rotatable with respect to the hub according to a thrust load applied to the bearing. In a second embodiment, the washer includes a segment extending radially outward from an axially disposed segment and the radially extending segment includes the first surface. In a third embodiment, the washer includes an axially disposed segment and the axially disposed segment includes the first surface. In another preferred embodiment, the hub includes at least one radially inwardly extending protrusion and the washer is retainable in an axial direction by the at least one protrusion. The hub includes at least one radially inwardly extending protrusion with an inner circumference and the washer includes an outer circumference located radially outward from the inner circumference. In a fourth embodiment, the hub includes a radially inwardly opening notch, the notch includes the second surface, and the washer is at least partially disposed in the notch. In a further preferred embodiment, the torque converter includes a side plate for the stator and the side plate is inwardly radially retained by the second surface. The stator side plate includes first and second radial sides, the first and second sides straight, planar, and parallel to each other.

It is a general object of the present invention to provide a means of centering a thrust bearing in a torque converter by use of existing component configurations in the torque converter.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
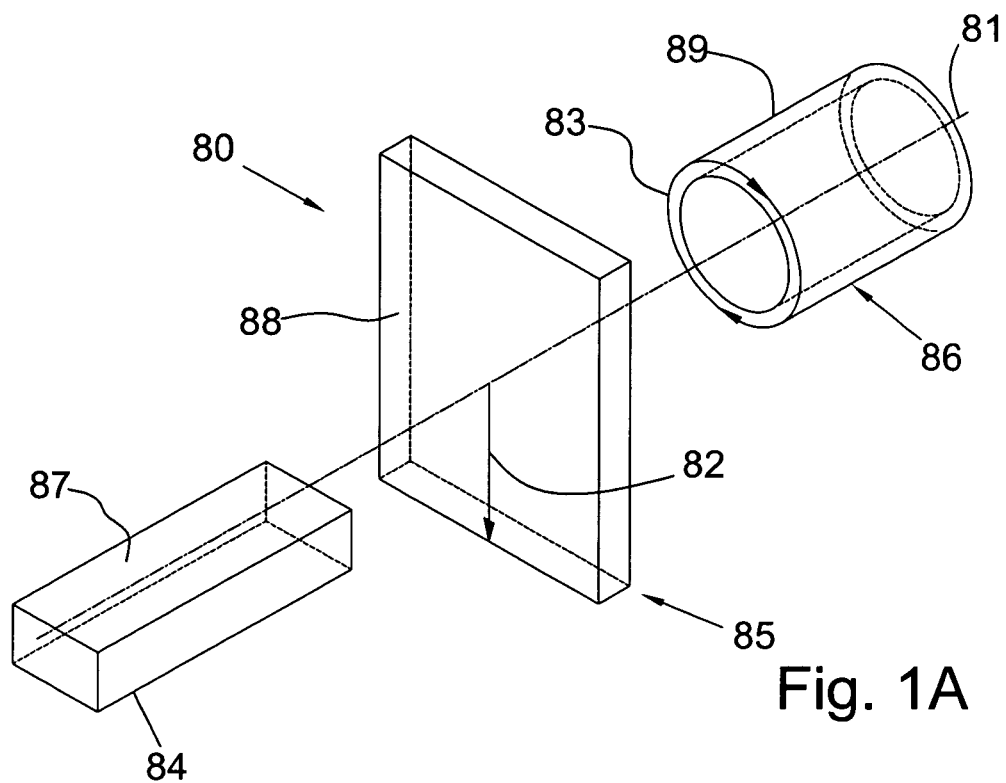
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
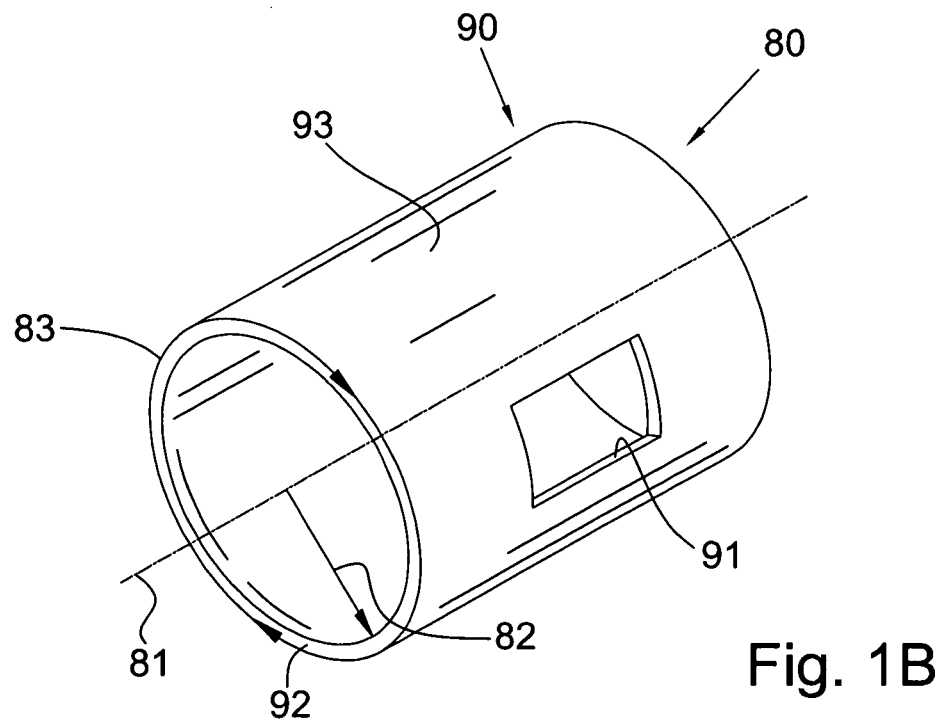
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2A:
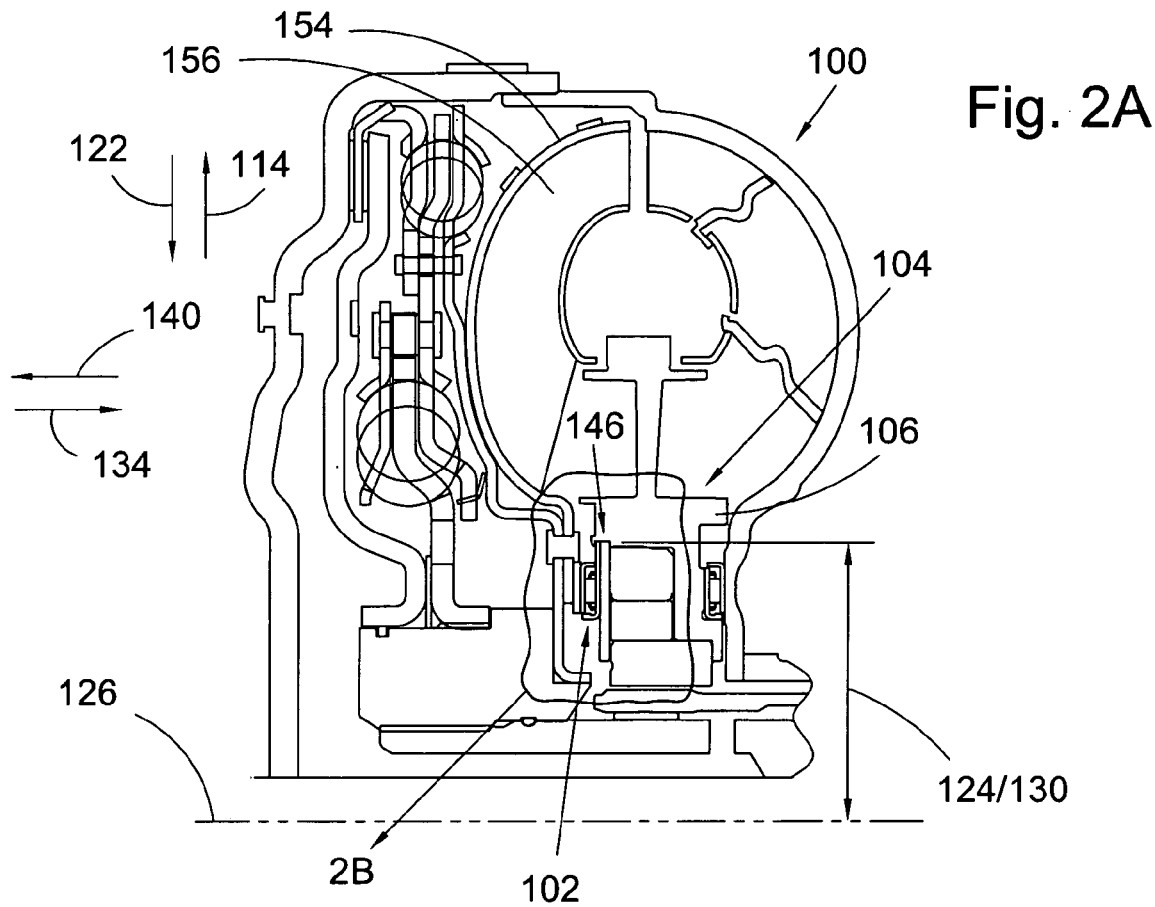
FIG. 2A is a partial cross-sectional view of a present invention torque converter.

FIG. 2A is a partial cross-sectional view of present invention torque converter 100.

Figures 2B, 2C:
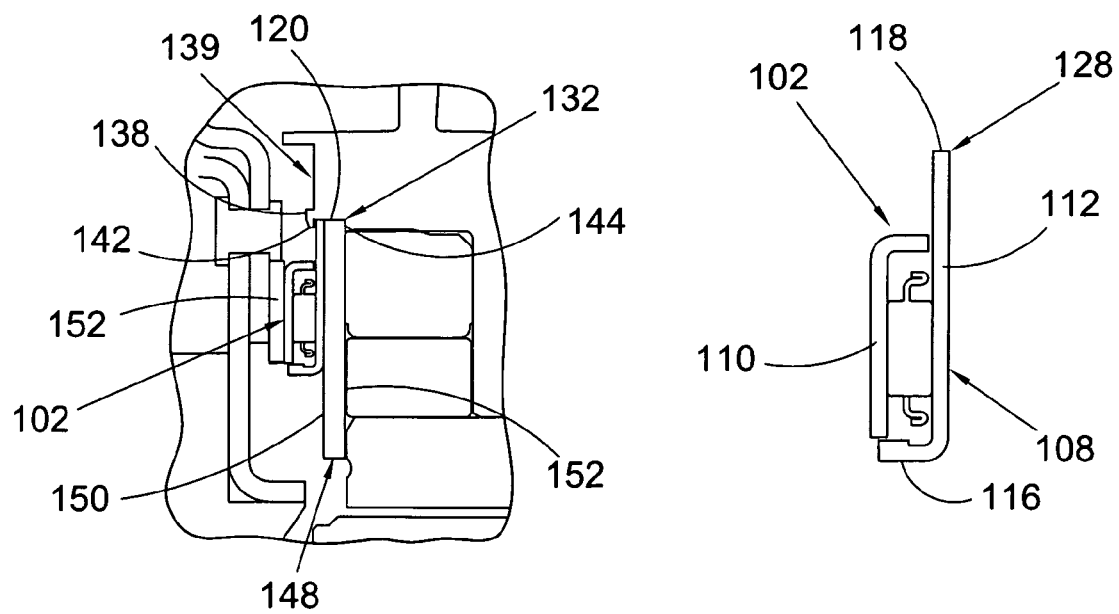
FIG. 2B is a detail of area 2B shown in FIG. 2A.
FIG. 2C is a detail of the thrust bearing shown in FIG. 2A.

FIG. 2B is a detail of area 2B shown in FIG. 2A.

FIG. 2C is a detail of the thrust bearing shown in FIG. 2A. The following should be viewed in light of FIGS. 2A through and 2C. Torque converter 100 includes thrust bearing 102 and stator 104 with hub 106. The bearing includes washers 108 and 110. Washer 108 includes radial segment 112 that extends radially outward in direction 114 from axially disposed segment 116. Washer 108, and in particular, segment 112, includes circumferential surface 118, which faces radially outward. The hub includes circumferential surface 120, facing radially inward. Washer 108 is radially inwardly retained, that is, retained in direction 122, by contact between circumferential surfaces 118 and 120. Alternately stated, washer 108 is prevented from movement in direction 114 by contact with surface 120. In a preferred embodiment, washer 108 is radially centered within torque converter 100 by contact with the hub, specifically by contact with surface 120.

Washer 108 is not rotationally connected to the hub by mechanical means, such as splines or interlocking features. However, when sufficient thrust is applied to the washer in direction 134, the washer is rotationally connected to the side plate by friction and pressure. Therefore, the washer may be rotatable with respect to the hub when thrust loads are absent from the bearing. It is understood that when a sufficient thrust load is applied to the bearing in direction 134, the bearing may be displaced in direction 134 such that washer 108 is pressed against side plate 136 of the stator and rotates with the side plate and hub.

In another preferred embodiment, surface 118 is substantially continuous and at uniform distance 124 from axis 126 for the torque converter. That is, outer circumference 128 of washer 108 is substantially smooth and circular. In like manner, surface 120 is at uniform distance 130 from axis 126 for the torque converter (distances 124 and 130 are essentially equal and are shown as one in the figures). That is, inner circumference 132 of the hub is substantially smooth and circular. This configuration of surfaces 118 and 120 is a corollary to the lack of mechanical connection between the washer and the hub. It should be understood that notches could be placed in surfaces 118 and 120 while maintaining the general configuration of the surfaces and without resulting in a mechanical connection between washer 108 and the hub.

In a preferred embodiment, the hub includes at least one radially inwardly extending protrusion 138. The protrusion can be a continuous lip or can be circumferentially intermittent, that is, include a plurality of separate protrusions. In one embodiment, the protrusion is at axial end 139 of the hub. In another preferred embodiment, the protrusions are formed by staking end 139 after washer 108 has been installed in the stator. The washer is retainable in axial direction 140 by protrusion 138. That is, outer circumference 128 is radially outward of inner circumference 142 of the protrusion so that displacement of the washer in direction 140 is prevented when the washer contacts the protrusion. One example of when such contact may occur is when the torque converter experiences "ballooning." In one embodiment washer 108 is in constant contact with the protrusion and in another embodiment, there is an axial space between washer 108 and the protrusion, depending on the operation of the torque converter.

In another preferred embodiment, protrusion 138 and shoulder 144 of the hub form notch 146, which opens radially inward. Washer 108 is at least partially disposed in the notch. In one embodiment, the stator includes side plate 148, which is inwardly radially retained by surface 120 in a manner similar to that described for washer 108. The side plate includes radial sides 150 and 152. Advantageously, since the side plate is not needed for centering of the thrust bearing, specifically washer 108, sides 150 and 152 are straight, planar, and parallel to each other. For example, the side plate can be formed by a stamping operation to form an annular shape without further fabricating steps, such as adding lips or protrusions, which would increase the cost of producing the side plate.

In one embodiment, spacer 152 is disposed between washer 110 and shell 154 for turbine 156 as needed to fill axial space between the washer and the shell. In general, spacer 152 is provided and sized as needed to accommodate the thrust bearing to an existing configuration of a torque converter housing the bearing, such as torque converter 100.

Figure 3A:
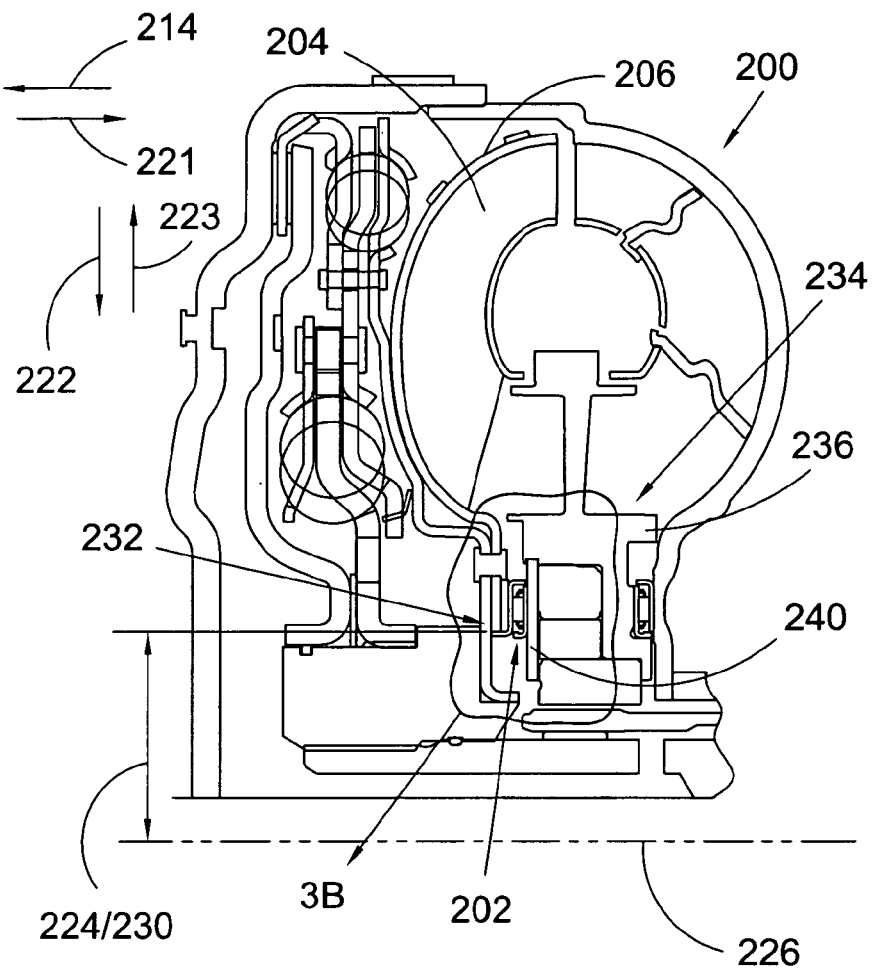
FIG. 3A is a partial cross-sectional view of a present invention torque converter.

FIG. 3A is a partial cross-sectional view of present invention torque converter 200.

Figure 3B:
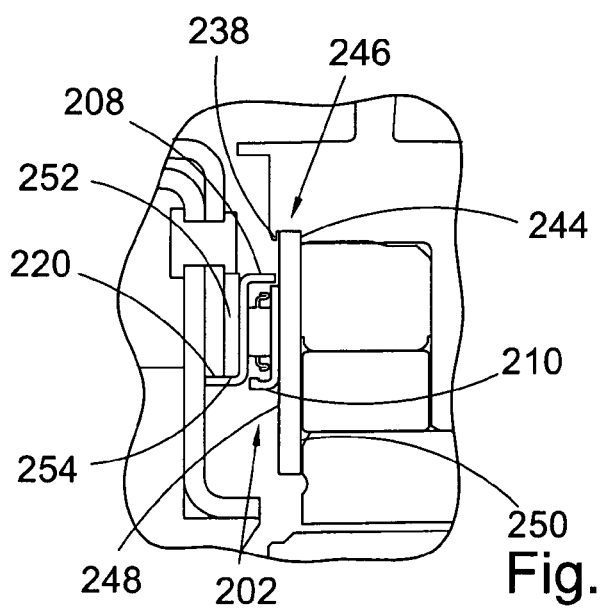
FIG. 3B is a detail of area 3B shown in FIG. 3A.

FIG. 3B is a detail of area 3B shown in FIG. 3A.

Figure 3C:
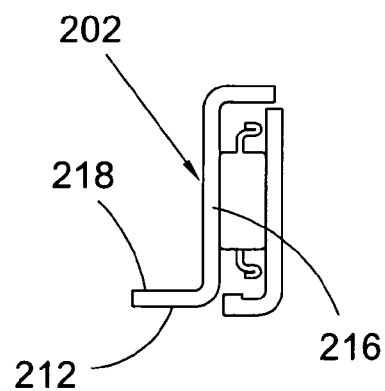
FIG. 3C is a detail of the thrust bearing shown in FIG. 3A.

FIG. 3C is a detail of the thrust bearing shown in FIG. 3A. The following should be viewed in light of FIGS. 3A through and 3C. Torque converter 200 includes thrust bearing 202 and turbine 204 with shell 206. The bearing includes washers 208 and 210. Washer 208 includes axial segment 212 that extends axially in direction 214 from radially disposed segment 216. Washer 208, and in particular, segment 212, includes circumferential surface 218, which faces radially outward. The shell includes circumferential surface 220, facing radially inward. Washer 208 is radially inwardly retained, that is, retained in direction 222, by contact between circumferential surfaces 218 and 220. Alternately stated, washer 208 is prevented from movement in direction 223 by contact with surface 220. In a preferred embodiment, washer 208 is radially centered within torque converter 200 by contact with the shell, specifically by contact with surface 220.

Washer 208 is not rotationally connected to the hub by mechanical means, such as splines or interlocking features. However, when sufficient thrust is applied to the washer in direction 221, the washer is rotationally connected to the side plate by friction and pressure. Therefore, the washer may be rotatable with respect to the hub when thrust loads are absent from the bearing. It is understood that when a sufficient thrust load is applied to the bearing in direction 221, the bearing may be displaced in direction 221 such that washer 208 is pressed against side plate 240 of the stator and rotates with the side plate and hub.

In another preferred embodiment, surface 218 is substantially continuous and at uniform distance 224 from axis 226 for the torque converter. That is, surface 218 of washer 208 is substantially smooth and circular. In like manner, surface 220 is at uniform distance 230 from axis 226 for the torque converter (distances 224 and 230 are essentially equal and are shown as one in the figures). That is, inner circumference 232 of the shell is substantially smooth and circular. This configuration of surfaces 218 and 220 is a corollary to the lack of mechanical connection between the washer and the shell. It should be understood that notches could be placed in surfaces 218 and 220 while maintaining the general configuration of the surfaces and without resulting in a mechanical connection between washer 208 and the shell.

In one embodiment (not shown), washer 208 and shell 206 are rotationally connected by any means known in the art, for example, a spline or other interlocking connection.

The torque converter includes stator 234 with hub 236. In one embodiment, the hub includes at least one radially inwardly extending protrusion 238. The protrusion can be a continuous lip or can be circumferentially intermittent, that is, include a plurality of separate protrusions. Side plate 240 for the stator is retainable in axial direction 241 by protrusion 238. That is, the protrusion prevents further displacement of the side plate in direction 214 once the side plate contacts the protrusion. One example of when such contact may occur is when the torque converter experiences "ballooning." In one embodiment, side plate 240 is in constant contact with the protrusion and in another embodiment, there is an axial space between the side plate and the protrusion, depending on the operation of the torque converter.

In another preferred embodiment, protrusion 238 and shoulder 244 of the hub form notch 246, which opens radially inward. The side plate is at least partially disposed in the notch. The side plate includes radial sides 248 and 250. Advantageously, since the side plate is not needed for centering of the thrust bearing, sides 248 and 250 are straight, planar, and parallel to each other. For example, the side plate can be formed by a stamping operation to form an annular shape without further fabricating steps, such as adding lips or protrusions, which would increase the cost of producing the side plate.

In one embodiment, spacer 252 is disposed between washer 208 and shell 206 as needed to fill axial space between the washer and the shell. In general, spacer 252 is provided and sized as needed to accommodate the thrust bearing to an existing configuration of a torque converter housing the bearing, such as torque converter 200.

In one embodiment, the spacer includes circumferential surface 254, facing radially inward. Washer 208 is radially inwardly retained, that is, retained in direction 222, by contact between circumferential surfaces 218 and 254. Alternately stated, washer 208 is prevented from movement in direction 223 by contact with surface 254. Washer 208 is radially centered within torque converter 200 by contact with the spacer, specifically by contact with surface 254. In another embodiment, washer 208 is radially retained by both shell 206 and the spacer.

The following should be viewed in light of FIGS. 2A through 3C. Thrust bearings 102 and 202 are advantageously centered by the use of component configurations already in place for other purposes in torque converters 100 and 200, respectively. For example, surface 120 is in place to center side plate 148. Thus, without the necessity of more extensive fabrication operations on the side plate or other components, washer 108 is centered by "existing" surface 120. Surface 220 is necessarily a part of shell 206. Thus, in like manner, without the necessity of more extensive fabrication operations on side plate 240 or other components, washer 208 is centered by "existing" surface 220.

Although a present invention torque converter has been shown in a specific torque converter with a specific configuration of component parts, it should be understood that a present invention torque converter is not limited to the configurations shown.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A torque converter, comprising:
   a thrust washer including:
      a first washer including:
         a radially disposed segment including a radially outwardly facing circumferential surface including a radially outermost end of the first washer; and,
         an axially disposed segment extending from the radially disposed segment and including a radially innermost end of the first washer; and,
      a second washer at least partially aligned with the first washer in a radial direction or in an axial direction; and,
   a stator hub with:
      a radially inwardly facing circumferential surface; and
      at least one radially inwardly extending protrusion, wherein the axially disposed segment extends from the radially disposed segment in a direction away from the stator hub, wherein the radially outwardly facing circumferential surface and the radially inwardly facing circumferential surface are free of an interlocking engagement, wherein the washer is radially centered by contact between the radially outwardly facing circumferential surface and the radially inwardly facing circumferential surface, and wherein the washer is retainable in an axial direction by the at least one protrusion.

2. A torque converter, comprising:
   a thrust washer including:
      a first washer including:
         a radially disposed segment;
         a first axially disposed segment extending from the radially disposed segment and including a radially innermost end of the first washer with a radially outwardly facing circumferential surface; and, a second axially disposed segment extending from the radially disposed segment and including a radially outermost end of the first washer; and, a second washer at least partially aligned with the first washer in an axial direction; and, a turbine shell with a radially inwardly facing circumferential surface, wherein the washer is radially centered by contact between the radially inwardly facing and radially outwardly facing circumferential surfaces.

* * * * *